United States Patent [19]

Nesson et al.

[11] 4,001,848
[45] Jan. 4, 1977

[54] CAMERA CONSTRUCTION

[75] Inventors: Israel Nesson, Brighton, Mass.;
Edwin E. Faris, Wyckoff; Robert G. Palmer, Wayne, both of N.J.

[73] Assignee: Berkey Photo, Inc., Paramus, N.J.

[22] Filed: June 12, 1975

[21] Appl. No.: 586,257

[52] U.S. Cl. .................. 354/196; 354/149; 354/270

[51] Int. Cl.² .................. G03B 3/00; G03B 13/02

[58] Field of Search .......... 354/40, 41, 42, 47, 354/149, 196, 270, 272, 273, 274

[56] References Cited

UNITED STATES PATENTS

| 3,273,483 | 9/1966 | Weidner et al. | 354/149 X |
| 3,680,459 | 8/1972 | Okura | 354/196 |
| 3,832,722 | 8/1974 | Douglas | 354/196 X |
| 3,914,777 | 10/1975 | Slavitter | 354/196 |
| 3,916,425 | 10/1975 | Tonaba | 354/196 |

Primary Examiner—John Gonzales
Attorney, Agent, or Firm—Neuman, Williams, Anderson & Olson

[57] ABSTRACT

A camera construction is provided which embodies a shutter means, a trigger means for actuating the shutter means, and a pair of iris blades mounted for simultaneous movement in opposite directions to vary the configuration of an iris opening which is defined thereby and is aligned with the camera lens. The movement of the iris blades is responsive to the independent manipulation of a plurality of manual controls separate from the trigger means. The permissible range of movement of the iris blades by each manual control is unequal.

7 Claims, 9 Drawing Figures

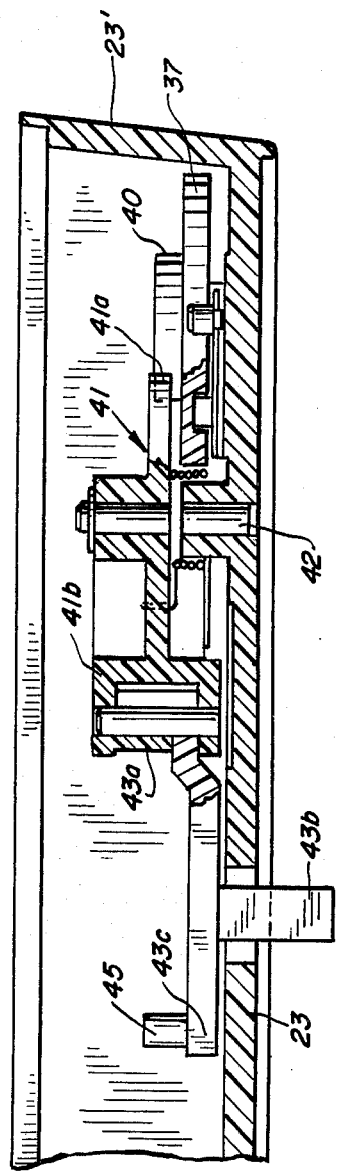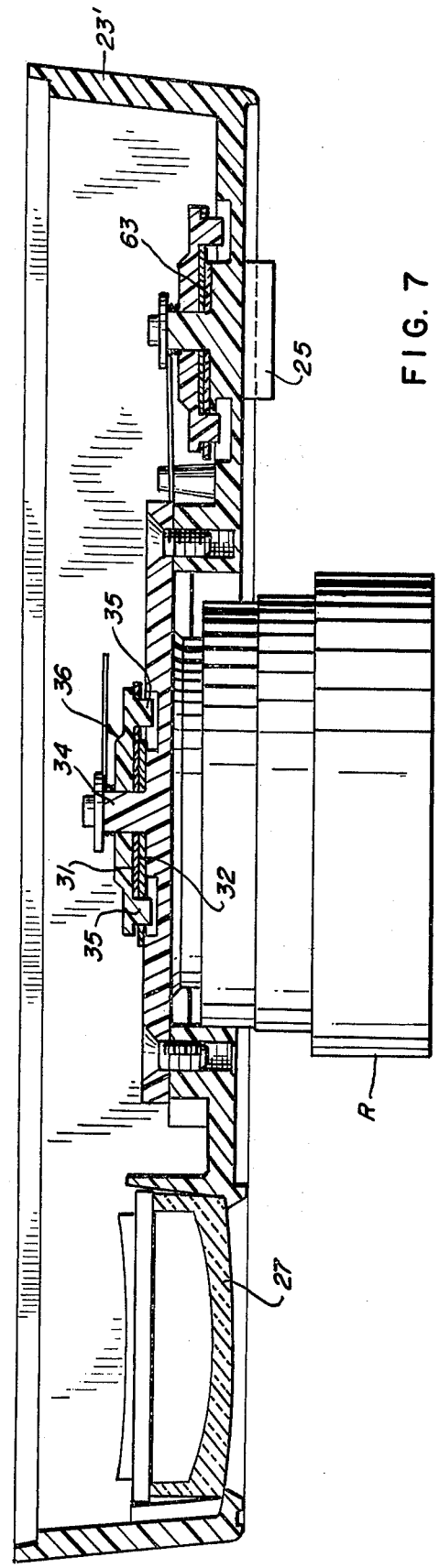
FIG. 6
FIG. 7

CAMERA CONSTRUCTION

BACKGROUND OF THE INVENTION

Varying the size of the iris for a camera lens has heretofore been accomplished in a variety of ways; however, the latter have oftentimes been beset with one or more of the following shortcomings: (a) the mechanism for accomplishing the result was of a complex, costly construction prone to frequent malfunction; (b) the mechanism was awkward to manipulate; (c) the mechanism was not reliable; and (d) the mechanism could not be readily and accurately adjusted to compensate for various manufacturing tolerances.

SUMMARY OF THE INVENTION

Thus, it is an object of the invention to provide a camera construction having means for varying the size of the iris opening which is not beset with any of the aforenoted shortcomings.

It is a further object of the invention to provide a camera construction wherein the size of the iris opening may be readily varied only when a predetermined condition exists such as, for example, when the flash means for the camera is disposed in an operative position.

It is a further object of the invention to provide a camera construction wherein the size of the iris opening may be varied by the adjustment of the focusing means and/or the light-dark control means.

It is a still further object of the invention to provide a camera construction wherein major size adjustment of the iris opening may be automatically effected by manual manipulation of the focusing means, and minor adjustment thereof may be automatically effected by manual manipulation of the light-dark control means provided on the camera.

Further and additional objects will appear from the description, accompanying drawings, and appended claims.

In accordance with one embodiment of the invention a camera construction is provided which embodies a pair of iris blades which are mounted behind the camera lens and are adapted to be simultaneously moved in opposite directions to vary the configuration of an iris opening formed thereby. A link assembly is mounted within the camera housing and is adapted to effect movement of the blades in response to the manipulation of the lens focusing means and/or the light-dark control means, both of which are embodied in the camera.

DESCRIPTION

For a more complete understanding of the invention, reference should be made to the drawings wherein.

Figure 4:
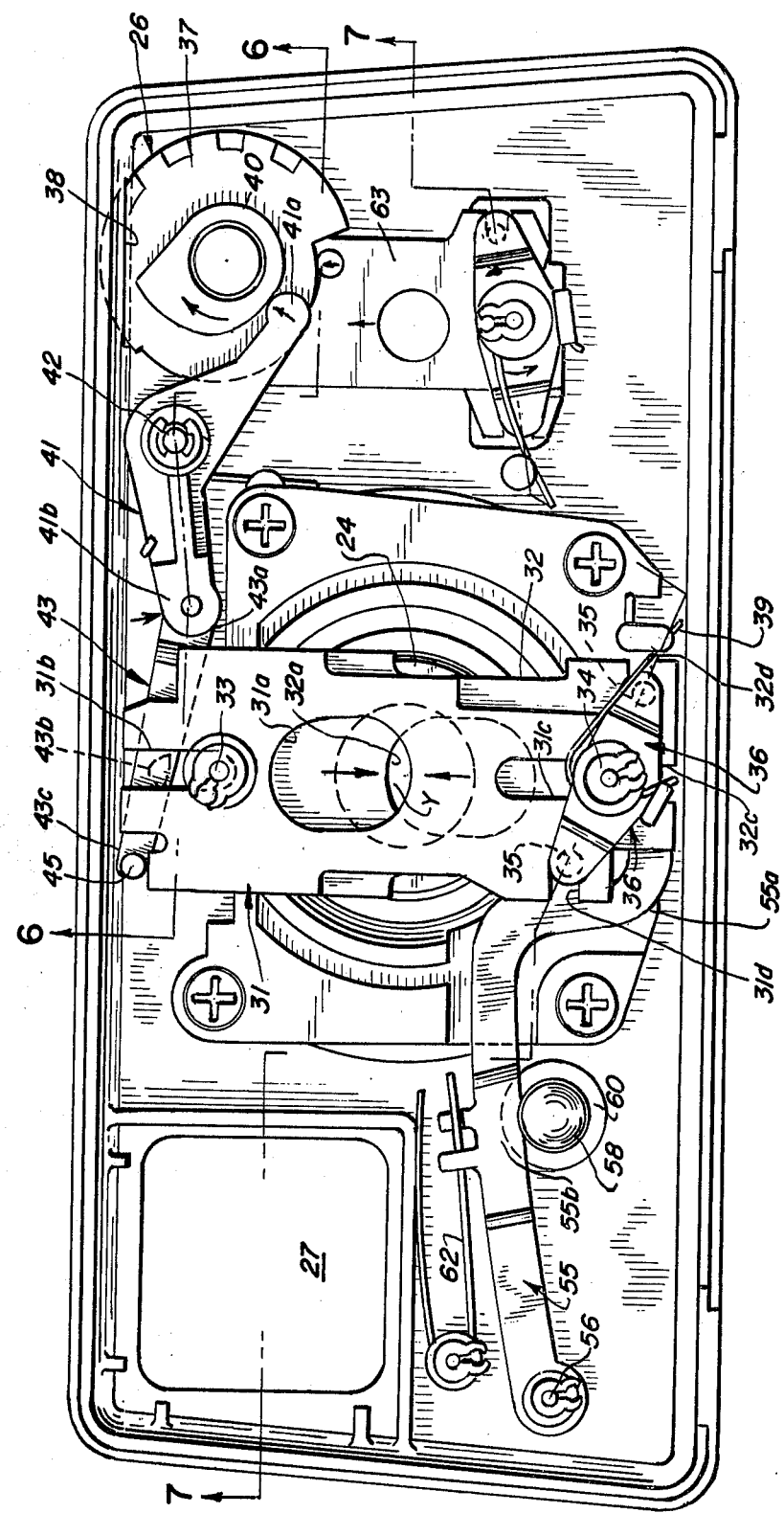
FIG. 4 is like FIG. 3 but showing the iris blades in a changed position wherein the resulting iris opening is of minimum size.

FIGS. 6 and 7 are fragmentary enlarged sectional views taken along lines 6—6 and 7—7, respectively, of FIG. 4.

Figure 8:
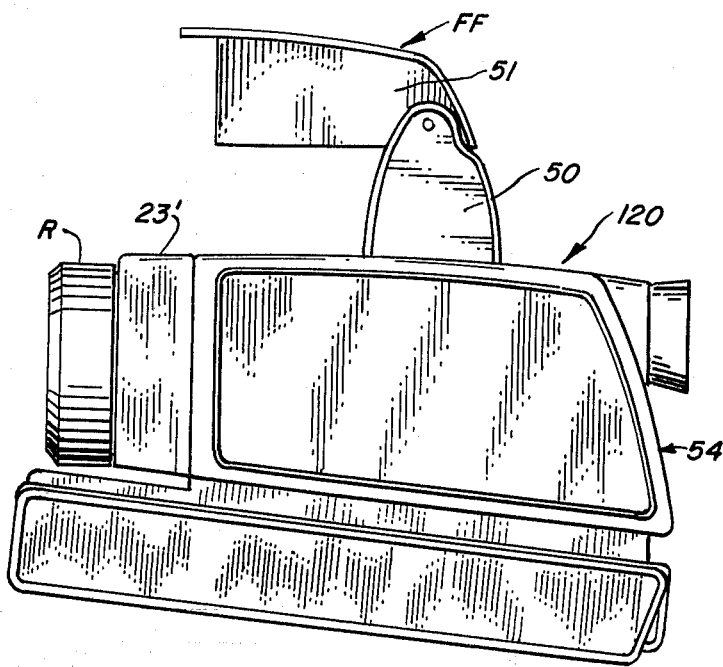

FIG. 8 is a side elevational view of a modified camera construction having a self-contained flash unit and showing said unit in an operative position.

Figure 9:
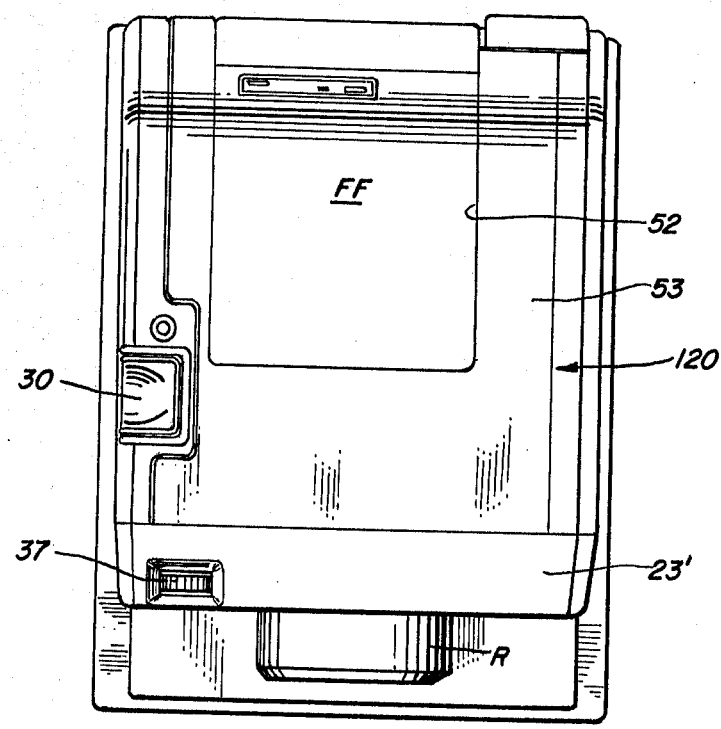

FIG. 9 is a top plan view of the camera construction of FIG. 8 and showing the flash unit in a retracted inoperative position.

Figure 1:
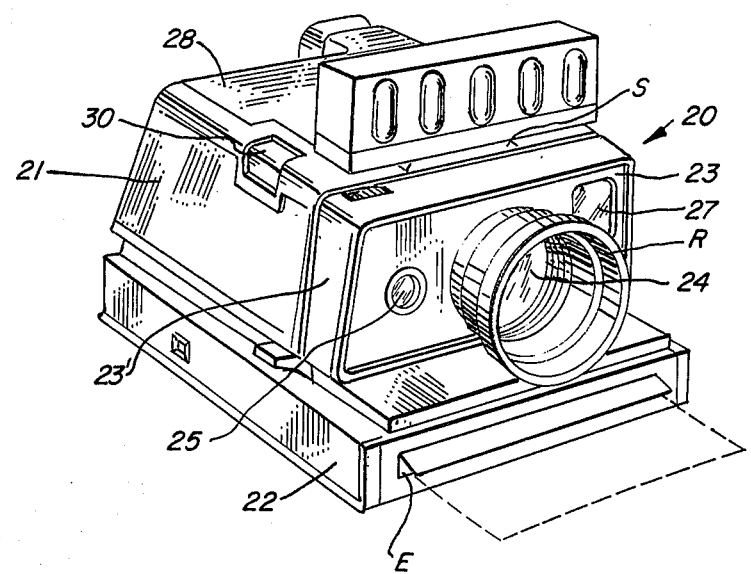
FIG. 1 is a perspective view of one form of the improved camera construction and showing a removable flash unit mounted in operative position on the top surface of the camera housing.
Figure 2:
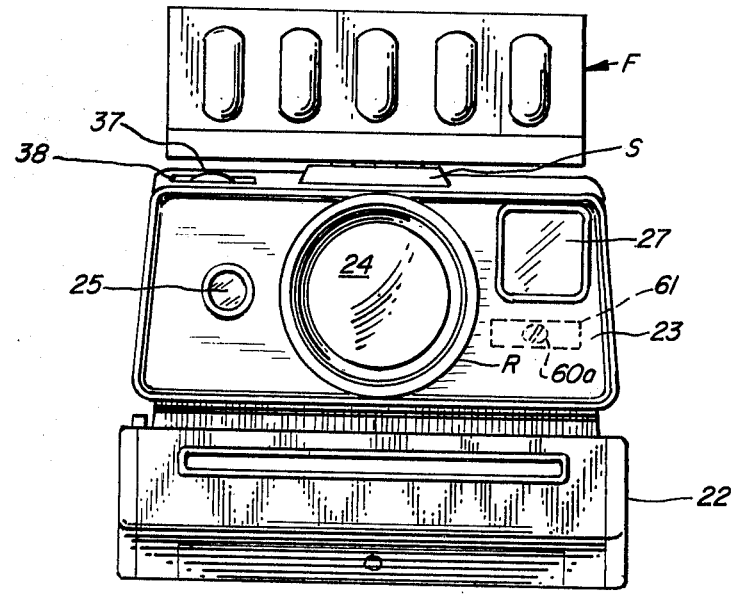
FIG. 2 is an enlarged front elevational view of the camera construction of FIG. 1.

Referring now to the drawings and more particularly to FIGS. 1 and 2, one form of the improved camera construction 20 is shown. The illustrated camera construction is of a type which is adapted to accommodate a packet of self-developing film currently available in the retail market. The camera construction 20 may embody many of the structural features of the camera construction disclosed in pending application for U.S. Pat. Ser. No. 558,933 filed Mar. 17, 1975.

Basically, camera construction 20 includes a housing 21 having the lower portion 22 thereof provided with a chamber of such configuration as to slidably accommodate the packet of self-developing film, not shown. The entry E to the chamber is spaced forwardly of the front panel 23 of the housing; such a panel is frequently referred to in the art as a Bezel assembly. The panel 23 is delimited by a rearwardly extending peripheral flange 23'. Mounted substantially centrally on panel 23 is a lens 24 which is encompassed by a manually adjustable focusing ring R. Offset to one side of lens 24 is a second lens 25 which forms a component of a light-dark control means 26, see FIGS. 3 and 4. Disposed on the opposite side of lens 24 is a viewfinder opening 27. The viewfinder and the various components comprising same form no part of the instant invention.

Located on a side of housing 21 and adjacent the upper surface 28 thereof is a manual shutter-release button 30. Depressing of the button causes the shutter blades, not shown, which are normally disposed between the iris blades and the lens 24, to move from a cocked to an uncocked position, thereby exposing the film.

The housing upper surface 28 in the illustrated embodiment is provided with a suitable socket S which is adapted to removably accommodate the depending prongs formed on a flash unit F; such a unit is currently available in the retail market under the trademark FLASHBAR. The socket S is preferably located adjacent the front panel 23 and is substantially aligned with the axis of the lens 24. The camera construction 20 may be of a type which accommodates only film having a predetermined speed.

Figure 3:
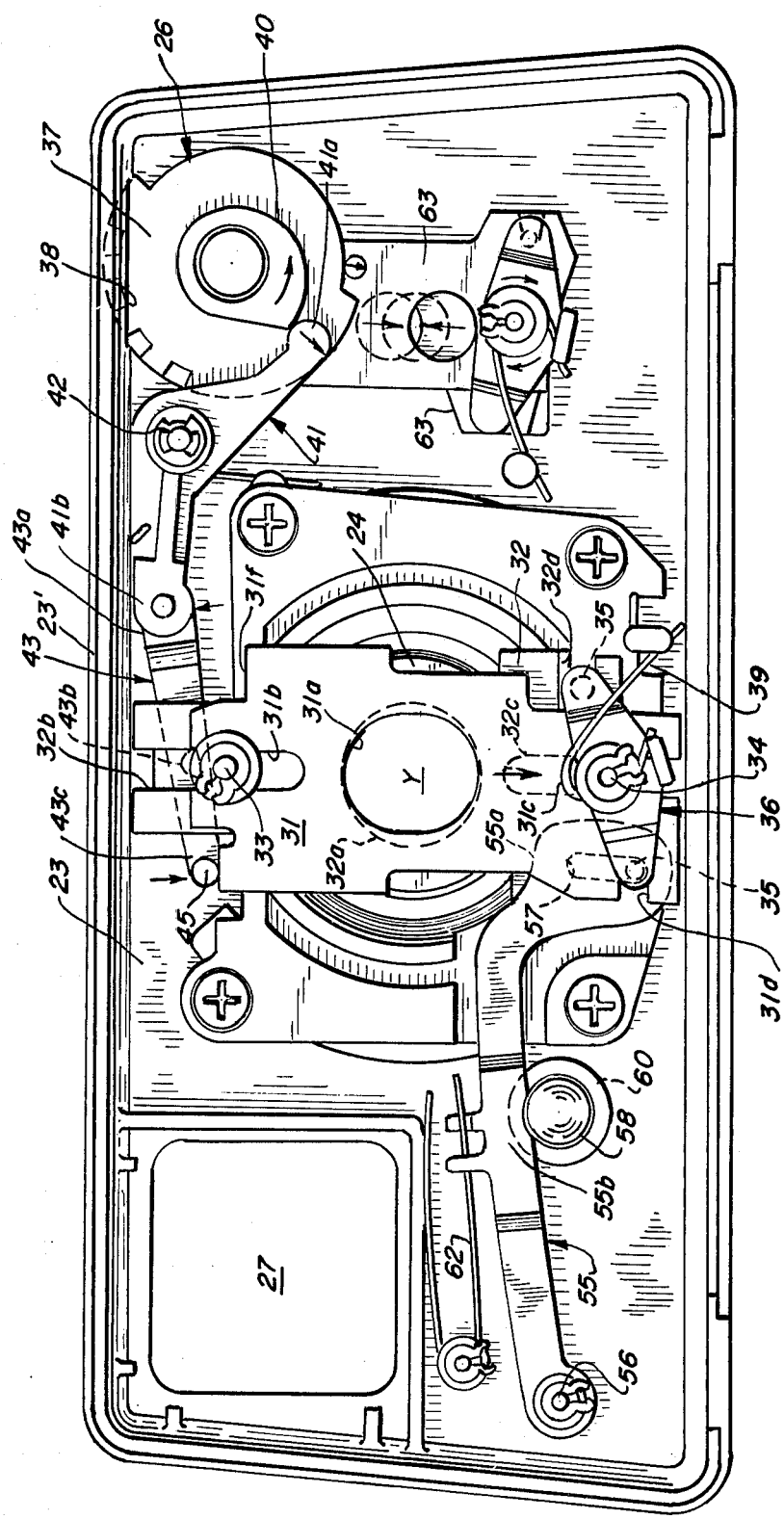
FIG. 3 is a fragmentary enlarged interior elevational view of the front panel unit, sometimes referred to as a Bezel assembly, of the camera construction of FIG. 1 and showing the iris blades mounted thereon in a relative position wherein the blades cooperate with one another to form an iris opening of maximum size.

As seen in FIGS. 3 and 4, a plurality of components, to be hereinafter described, are carried on the concealed or interior surface of the front panel 23. Positioned behind the lens 24 are a pair of apertured iris blades 31 and 32 arranged in face-to-face relation and operable in parallel planes disposed transverse to the lens axis. The blades are similar in construction and formed preferably of planar thin gauge metal. The blades are provided with central apertures 31a and 32a which overlap one another by varying amounts, depending upon the relative positions of the blades and, thus, vary the configuration of the resulting iris opening Y. The iris opening Y is disposed in coaxial alignment with the axis of lens 24. Formed in the upper and lower edges of each blade are elongated closed end slots 31b and 31c and 32b and 32c which are aligned with each other and with the center of the opening 31a and 32a. Disposed within the slots are fixedly mounted guide posts 33 and 34 which are in spaced parallel relation with respect to the lens axis.

Each blade has an additional slot 31d or 32d formed in the lower peripheral side thereof; however, these slots are disposed on opposite sides of said blades. The slots 31d and 32d are adapted to slidably accommodate transverse pins 35 which are formed at opposite ends of an elongated rocker arm 36, see FIGS. 3–5. The arm 36 is adapted to pivot at its midpoint about guide post 34 as an axis and is biased in a clockwise direction by a spring 39. Thus, by reason of the bias on rocker arm 36, the blades are urged to assume a position of minimum overlap, see FIG. 4. The rocker arm 36 effects simultaneous movement of the blades in opposite directions as will be described hereinafter.

The light-dark control means 26, as seen more clearly in FIGS. 3 and 4, includes a manually adjustable disk 37 having a knurled peripheral edge, a portion of which is adapted to protrude through an opening 38 formed in the upper surface of the peripheral flange 23' encompassing the panel 23. The disk 37 is adapted to rotate about its central axis and has formed on one side thereof a cam surface 40, see FIGS. 3 and 4, which is continuously engaged by one end 41a of a follower lever 41, the latter being adapted to pivot at approximately its midpoint about a fixed pin 42. The opposite end 41b of lever 41 is pivotally connected to an end 43a of an elongated second lever 43. At approximately its midpoint, lever 43 is provided with a transversely extending outwardly protruding finger 43b which is adapted to slidably engage an internal cam surface 44 formed on the focusing ring R, see FIG. 5. The upper surface of finger 43b is tapered so as to form an elongated ridge 43d which is adapted to contact the cam surface 44.

Figure 5:
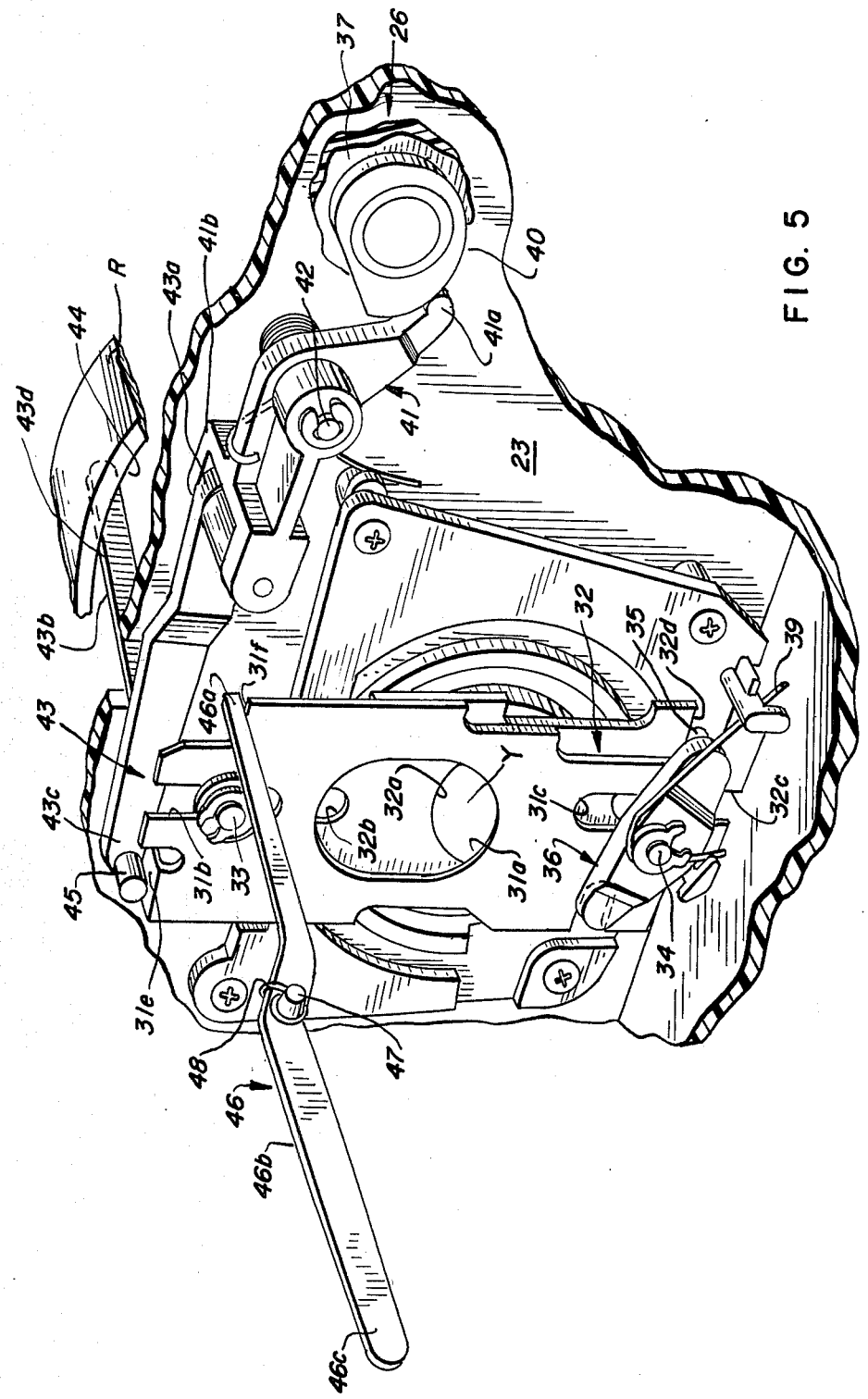
FIG. 5 is an enlarged fragmentary perspective view of a link assembly embodied in the camera construction of FIG. 1.

The opposite end 43c of lever 43 is provided with a transversely extending stud 45 which, as seen in FIG. 5, engages a portion of the upper edge 31e of blade 31 disposed to one side of guide slot 31b. Stud 45 is in continuous contact with edge portion 31e when the flash unit F is in operative position.

When flash unit F is withdrawn from socket S, portion 31f of the upper edge of blade 31 is automatically engaged by one end 46a of an elongated third lever 46, see FIG. 5, which is mounted so as to pivot about a fixed post 47. The pivotal axis of lever 46 is transversely disposed relative to the pivotal axes of levers 41 and 43. Lever 46 is biased in a clockwise direction by a spring 48. The bias exerted by spring 48 is greater than the bias exerted by spring 39 on the rocker arm 36 and, thus, the blades will be caused to assume the positions shown in FIG. 3, whereby the iris opening Y is of maximum size. It should be noted that when the blades are disposed in the FIG. 3 positions, the end 43c of lever 43 may or may not be disengaged from the upper edge portion 31e of the blade 31; however, in either case the blades would be non-responsive to the manual manipulation of either the focusing ring R or the light-dark control disk 37.

When the flash unit F is inserted into the socket, see FIG. 1, the prongs thereof, which depend from the underside of the unit, are of such a length that they will strike portion 46b of lever 46 and cause the latter to overcome the bias of spring 48 and pivot in a counterclockwise direction about post 47 as an axis.

Where the flash unit is in the form of a self-contained strobe light assembly FF, as embodied in the modified camera construction 120, shown in FIGS. 8 and 9, the end portion 46c of lever 46 is engaged by a projection, not shown, formed on a pivotal bracket 50 and disposed adjacent the pivotal axis of the bracket. The bracket connects the strobe light casing 51 to a recess 52 formed in the top surface 53 of the camera housing 54, see FIG. 9. The shape and size of the recess 52 is such that it will readily accommodate the bracket 50 and the strobe light casing 51 when the strobe light assembly assumes a retracted inoperative position, see FIG. 9. When the assembly FF assumes its retracted position, the projection on the bracket 50 will disengage the end 46c of lever 46, thereby enabling the bias spring 48 to pivot the lever 46 in a clockwise direction and cause the end portion 46a to engage the edge portion 31f of blade 31 and move the latter down to the position shown in FIG. 3.

Thus, where the flash unit comprises a removable unit F such as shown in FIGS. 1 and 2, the extent to which lever 46 projects from pivot point 47 in a direction away from the blades will depend upon the relative location of the socket S from the front wall 23 of the housing.

In order to compensate for manufacturing tolerances and to properly calibrate the iris opening to the various focus settings of ring R, an adjusting arm 55 is provided which is adapted to be pivoted about a fixed pin 56, see FIGS. 3 and 4. The opposite, or distal, end 55a is enlarged and provided with an elongated slot 57 which is adapted to slidably accommodate the pin 35 carried on one end of rocker arm 36.

At substantially the mid-portion 55b of arm 55 there is provided a cam surface 58 which is adapted to engage the underside of the arm, see FIGS. 3 and 4. The cam surface 58 is formed on the inner end of an adjusting screw 60 which is carried on the front panel and is offset relative to the central axis of the screw. The screw 60 has an exposed cross-slotted head 60a, which is normally concealed by a name plate 61 or the like which is applied at the factory to the exterior of the front panel 23 after the appropriate adjustment of the arm 55 has been made by turning the screw head 60a with the tip of a conventional screwdriver or the like, see FIG. 2. Arm 55 is biased in a clockwise direction by a spring 62 so that the arm portion 55b will be in continuous contact with cam surface 58.

As seen in FIGS. 3 and 4, there is associated with the light-dark control means 26 a pair of apertured shield blades 63 which are adapted to cooperate with the lens 25. The construction and operation of the shield blades form no part of the subject invention and are disclosed and described in detail in U.S. Pat. No. 3,922,690 issued Nov. 25, 1975.

Thus, it will be noted that a camera construction has been provided wherein the iris blades thereof are relatively movable to vary the configuration of the iris opening in response to two or more independently adjustable manually manipulated members.

The size and shape of the camera housing, the location of the light-dark control means; the size, shape and location of the socket for the flash unit or the recess for self-contained strobe light may be varied from that shown without departing from the scope of the invention. Furthermore, the iris blades, focusing ring, light-dark control means, flash unit and the lever assembly may be incorporated in other types of camera constructions from that heretofore illustrated and described.

We claim:

1. In a camera construction having a pair of iris blades mounted for simultaneous relative movement in opposite directions to define an iris opening of selected configuration, and control means for effecting movement of the iris blades; said control means comprising a manually adjustable first unit for effecting movement of the iris blades in response to the adjustment of said first unit, a second unit spaced from said first unit and manually adjustable independently thereof for effecting movement of the iris blades in response to the adjustment of said second unit, and a movable member common to said first and second units and independently movable thereby for imparting motion to the iris blades; said movable member including a link assembly having a lever adapted to engage one of the iris blades and effect movement thereof, said lever being mounted for pivotal movement about a plurality of selected pivotal axes, the pivotal axis selected for said lever being dependent upon which of said units is manually adjusted.

2. In the camera construction of claim 1 wherein the link assembly includes a pair of first and second levers pivotally interconnected to one another, said first lever being pivotal about a fixed axis, said second lever being adapted to engage one of the iris blades, said second lever pivoting about the pivotal interconnection between said levers as a first axis when said control means first unit is manually adjusted and pivoting about a second pivotal axis spaced from said first axis when said control means second unit is manually adjusted.

3. In the camera construction of claim 2 wherein the control means second unit comprises a rotatable light-dark control element having a cam surface in sliding engagement with a portion of said first lever, said portion being spaced from said fixed axis and from the interconnection with said second lever; and said control means first unit comprises an adjustable lens focusing element having a cam surface in sliding engagement with a portion of said second lever, said latter portion being spaced from the interconnection with said first lever and from the engagement of said second lever with the one iris blade.

4. In the camera construction of claim 3 wherein said second lever pivots about the engagement between the portion thereof and the focusing element cam surface as an axis when the light-dark control element is manually rotated, and said second lever pivots about the interconnection of said levers as an axis when the lens focusing element is manually adjusted.

5. In the camera construction of claim 2 wherein the link assembly includes a third lever spaced from said first and second levers and movable independently thereof, said third lever being adapted, when in one position of adjustment, to render said second lever ineffective in moving the iris blades in response to the adjustment of said control means first and second units.

6. In the camera construction of claim 5 wherein the third lever is movable to a second position of adjustment when a flash unit for the camera construction is disposed in an operative position relative to a housing for the camera construction, whereby the movement of the iris blades is responsive to the independent manual adjustment of the control means first and second units.

7. In the camera construction of claim 5 wherein the third lever is biased to assume said first position of adjustment when the flash unit for the camera construction is disposed in an inoperative position relative to the housing.

* * * * *